(12) United States Patent
Yamamoto

(10) Patent No.: US 8,508,855 B2
(45) Date of Patent: Aug. 13, 2013

(54) PROJECTION LENS AND PROJECTION-TYPE DISPLAY APPARATUS USING THE LENS

(75) Inventor: Chikara Yamamoto, Saitama (JP)

(73) Assignee: Fujifilm Corporation, Tokyo (JP)

( * ) Notice: Subject to any disclaimer, the term of this patent is extended or adjusted under 35 U.S.C. 154(b) by 323 days.

(21) Appl. No.: 13/075,594

(22) Filed: Mar. 30, 2011

(65) Prior Publication Data

US 2011/0242685 A1 Oct. 6, 2011

(30) Foreign Application Priority Data

Mar. 30, 2010 (JP) .................................. 2010-078038

(51) Int. Cl.
*G02B 13/16* (2006.01)
*G02B 13/22* (2006.01)
*G02B 9/14* (2006.01)

(52) U.S. Cl.
CPC ............... *G02B 13/16* (2013.01); *G02B 13/22* (2013.01); *G02B 9/14* (2013.01)
USPC .......................................... 359/651; 359/785

(58) Field of Classification Search
CPC ........... G02B 13/22; G02B 13/16; G02B 9/14
USPC ................... 359/650, 651, 785, 690
See application file for complete search history.

(56) References Cited

U.S. PATENT DOCUMENTS

| 6,038,078 A | * | 3/2000 | Yamamoto | ..................... 359/651 |
| 7,859,763 B2 | * | 12/2010 | Lu et al. | ......................... 359/649 |

FOREIGN PATENT DOCUMENTS

| JP | 2003-315675 | 11/2003 |
| JP | 2005-215310 | 8/2005 |

* cited by examiner

*Primary Examiner* — Zachary Wilkes
(74) *Attorney, Agent, or Firm* — Young & Thompson

(57) ABSTRACT

A projection lens is composed of a positive first lens group, a negative second lens group, and a positive third lens group, which are sequentially arranged from the magnification side of the projection lens, and the reduction side of the projection lens is telecentric. Further, the following formulas (1) and (2) are satisfied:

$$0.30 \leq d_{23}/f_3 \leq 0.65 \quad (1); \text{ and}$$

$$10 \leq |D_{12}/f\!f| \quad (2), \text{ where}$$

$d_{23}$: space in air between the second lens group and the third lens group, $f_3$: focal length of the third lens group, $D_{12}$: total length of the first lens group and the second lens group in the direction of an optical axis, and ff: length from the most magnification-side surface in the entire system of the projection lens to a magnification-side focus position of the entire system.

16 Claims, 9 Drawing Sheets

EXAMPLE 1

EXAMPLE 1

EXAMPLE 2

EXAMPLE 3

EXAMPLE 4

EXAMPLE 5

EXAMPLE 6

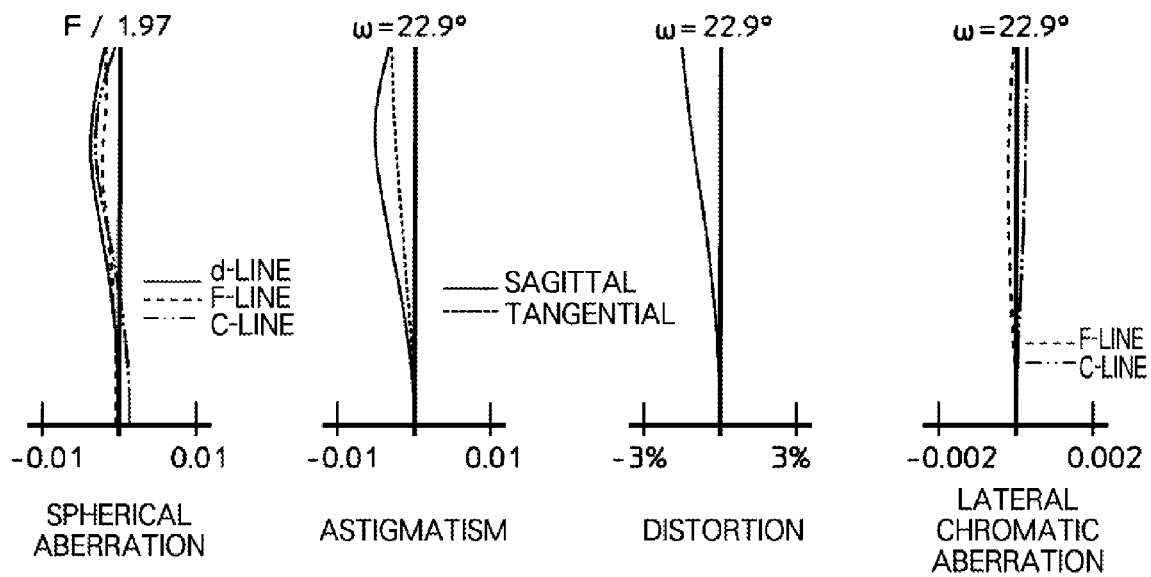
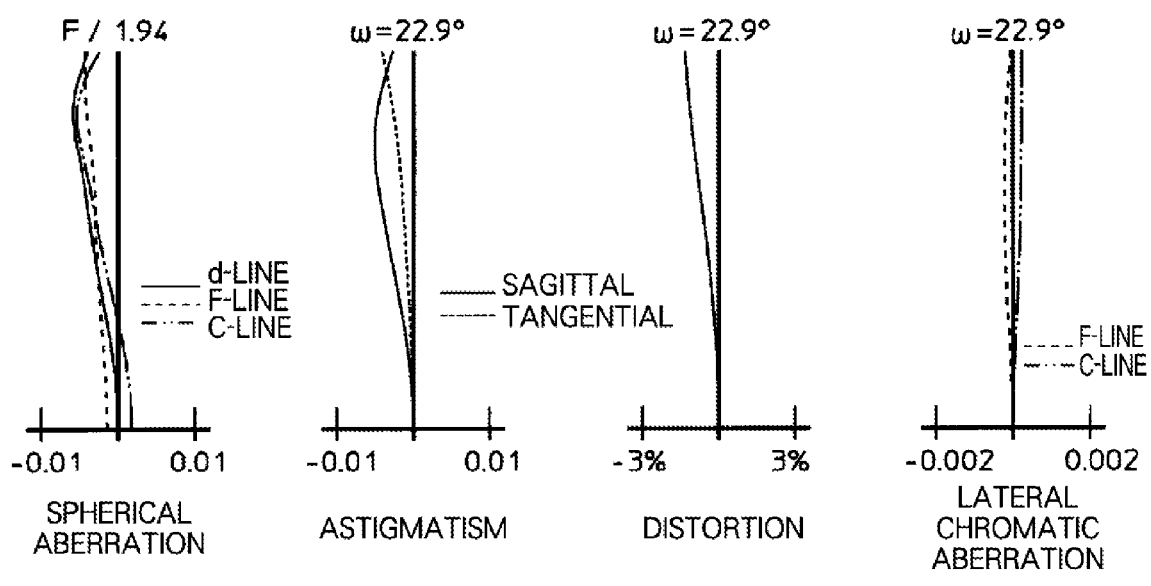

EXAMPLE 3
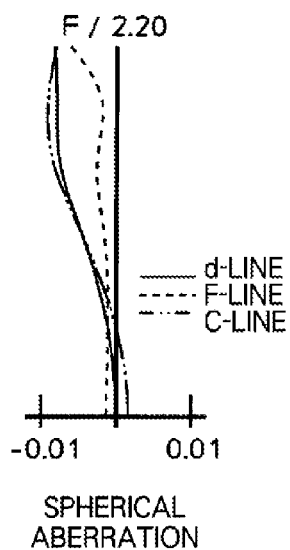
SPHERICAL
ABERRATION
Fig.9-i
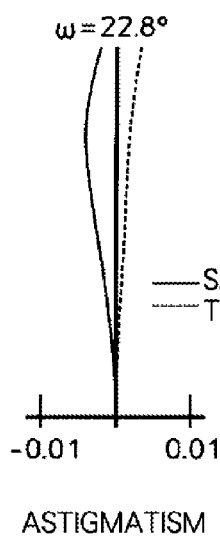
ASTIGMATISM
Fig.9-ii
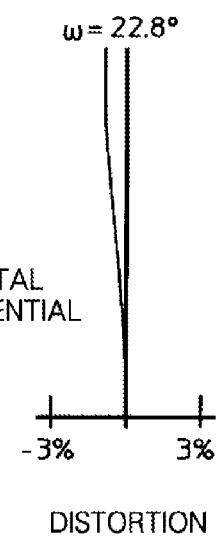
DISTORTION
Fig.9-iii
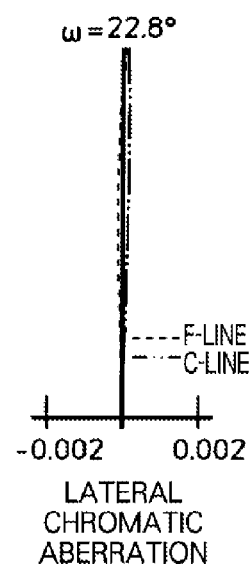
LATERAL
CHROMATIC
ABERRATION
Fig.9-iv
EXAMPLE 4
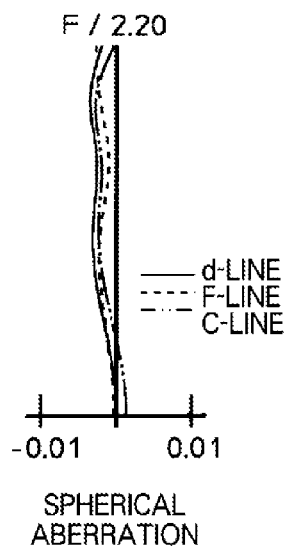
SPHERICAL
ABERRATION
Fig.10-i
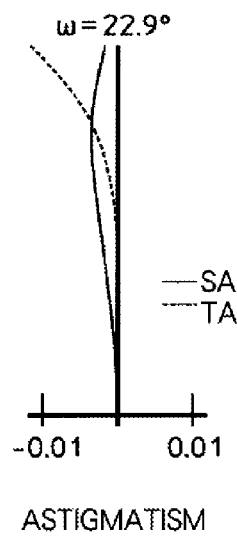
ASTIGMATISM
Fig.10-ii
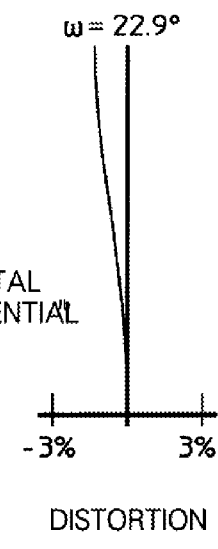
DISTORTION
Fig.10-iii
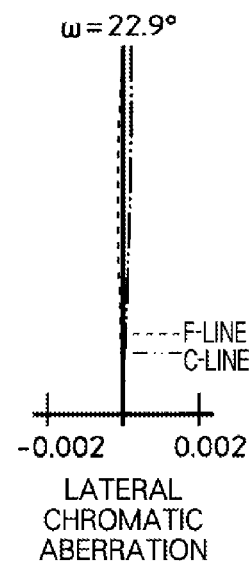
LATERAL
CHROMATIC
ABERRATION
Fig.10-iv

EXAMPLE 5
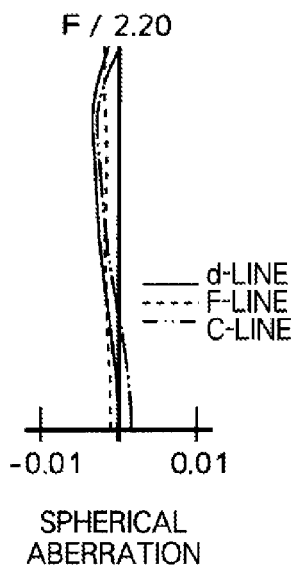
Fig.11-i  Fig.11-ii  Fig.11-iii  Fig.11-iv
EXAMPLE 6
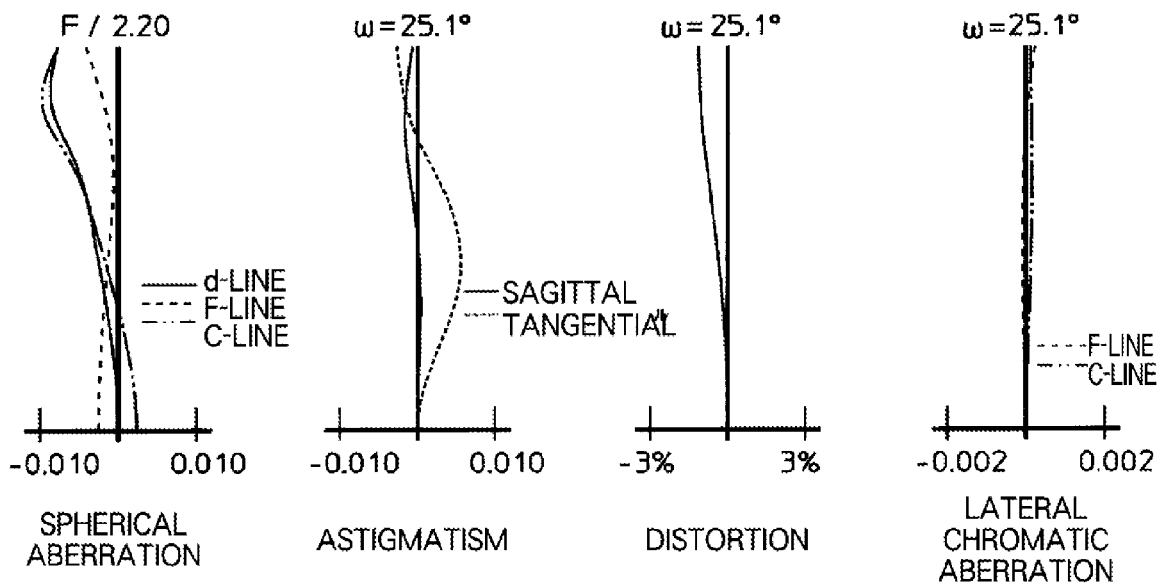
Fig.12-i  Fig.12-ii  Fig.12-iii  Fig.12-iv

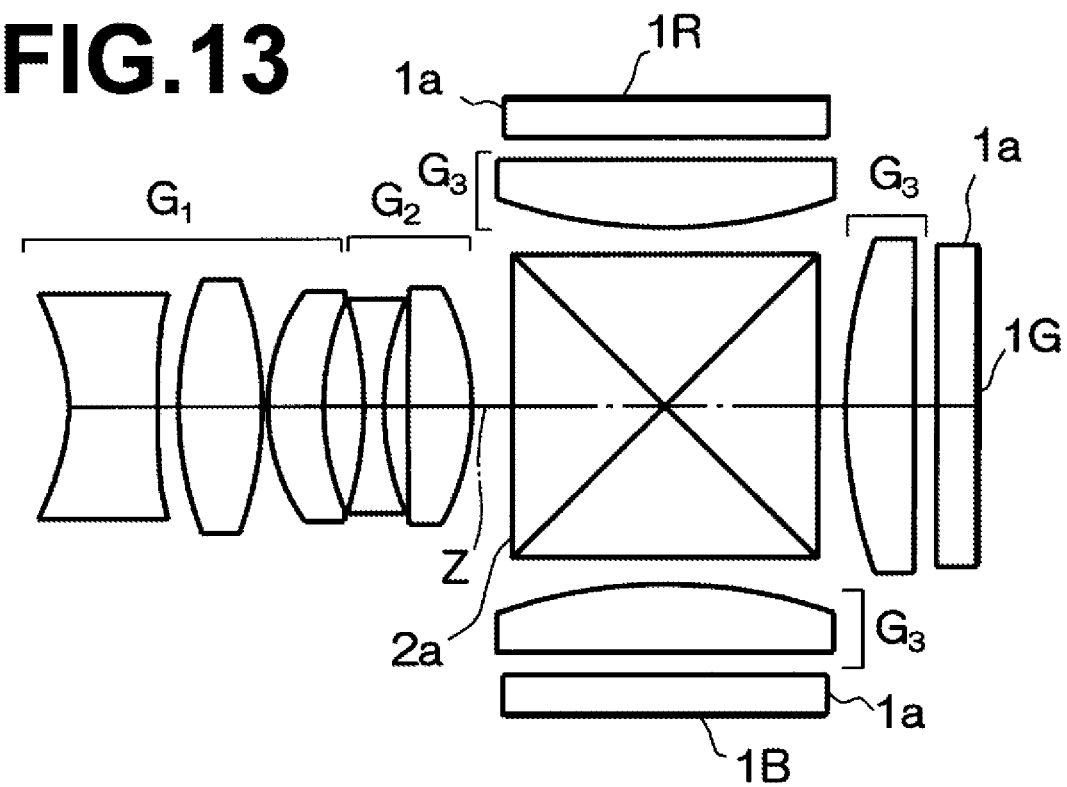
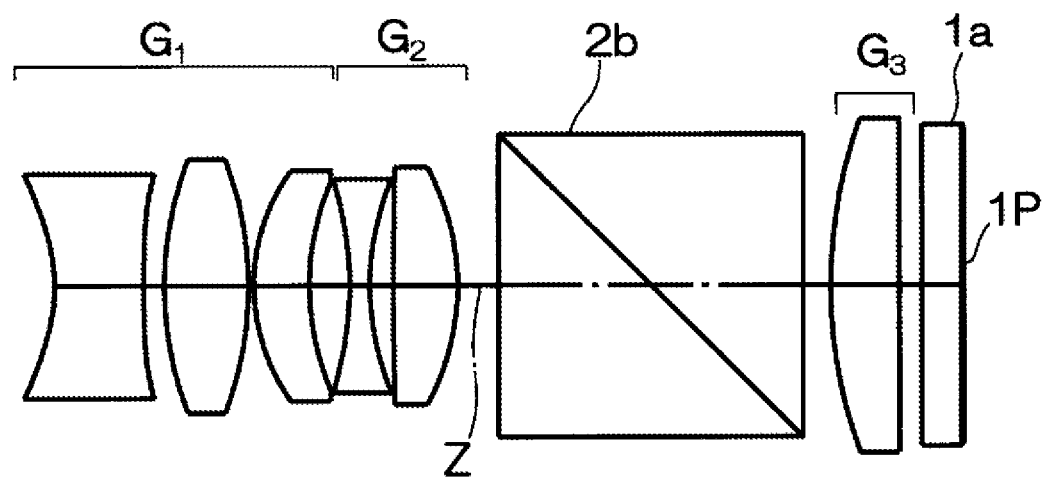

PROJECTION LENS AND PROJECTION-TYPE DISPLAY APPARATUS USING THE LENS

BACKGROUND OF THE INVENTION

1. Field of the Invention

The present invention relates to a projection lens to be mounted on a projection-type display apparatus, and the projection-type display apparatus. Particularly, the present invention relates to a projection lens appropriate for a small projector apparatus on which a light valve, such as a transmissive liquid crystal panel, a reflective liquid crystal panel and a DMD (digital micromirror device), is mounted, and to the projector apparatus.

2. Description of the Related Art

As projectors rapidly spread, and became widely used in recent years, a demand for small projectors that are lightweight and low-price, and which are conveniently usable and easily settable, increased. To satisfy such a demand, projections lenses for the projectors also need to be small, lightweight and low-price.

When the back focus of a projection lens is reduced, it is possible to reduce the outer diameter of a reduction-side lens in the projection lens. As such a projection lens, lenses disclosed in Japanese Patent No. 4164283 (Patent Document 1) and Japanese Unexamined Patent Publication No. 2005-215310 (Patent Document 2) are known.

In the projection lenses disclosed in Patent Documents 1 and 2, the outer diameters of the reduction-side lenses can be reduced. However, the number of lenses is 10 or 11, which is many, and the total length is too long. Further, in Patent Documents 1 and 2, an increase in the outer diameter of a magnification-side lens is not considered. Therefore, the size of the entire lens system is not sufficiently reduced.

SUMMARY OF THE INVENTION

In view of the foregoing circumstances, it is an object of the present invention to provide a projection lens (a lens for projection) that can reduce the size of the lens system (compact lens system) by reducing the length of the entire system and the outer diameter of at least one magnification-side lens. Further, it is another object of the present invention to provide a projection-type display apparatus using the projection lens.

A projection lens of the present invention is a projection lens comprising:

a first lens group having positive refractive power;
a second lens group having negative refractive power; and
a third lens group having positive refractive power, which are sequentially arranged from the magnification side of the projection lens, wherein the reduction side of the projection lens is telecentric, and wherein the following formulas (1) and (2) are satisfied:

$$0.30 \leq d_{23}/f_3 \leq 0.65 \quad (1); \text{ and}$$

$$10 \leq |D_{12}/f| \quad (2), \text{ where}$$

$d_{23}$: space in air between the second lens group and the third lens group, $f_3$: focal length of the third lens group, $D_{12}$: total length of the first lens group and the second lens group in the direction of an optical axis, and ff: length from the most magnification-side surface in the entire system of the projection lens to a magnification-side focus position of the entire system.

Further, it is desirable that the following formula (3) is satisfied:

$$bf/f_3 \leq 0.2 \quad (3), \text{ where}$$

bf: back focus in air of the entire system.

Further, it is desirable that the following formula (4) is satisfied:

$$1.2 \leq f_3/f \leq 1.9 \quad (4), \text{ where}$$

f: focal length of the entire system.

Further, it is desirable that the following formula (5) is satisfied:

$$0.4 \leq D_{12}/f_3 \leq 1.1 \quad (5).$$

Further, it is desirable that the following formula (6) is satisfied:

$$0.2 \leq f_1/f \leq 1.0 \quad (6), \text{ where}$$

$f_1$: focal length of the first lens group.

Further, it is desirable that the following formula (7) is satisfied:

$$-3.5 \leq f_2/f \leq -0.5 \quad (7), \text{ where}$$

$f_2$: focal length of the second lens group.

Further, it is desirable that the first lens group is composed of negative lens $G_{11}$, positive lens $G_{12}$ and positive lens $G_{13}$, which are sequentially arranged from the magnification side of the projection lens, or the first lens group is composed of negative lens $G_{11}$ and positive lens $G_{12}$, which are sequentially arranged from the magnification side of the projection lens.

Further, it is desirable that the second lens group is composed of negative lens $G_{21}$ and positive lens $G_{22}$, which are sequentially arranged from the magnification side of the projection lens.

Further, it is desirable that the third lens group consists of positive lens $G_{31}$.

Further, it is desirable that illumination light and projection light are separated from each other in an area between the second lens group and the third lens group.

Further, it is desirable that rays from a plurality of light valves are combined together in an area between the second lens group and the third lens group.

Further, it is desirable that a stop is arranged on the magnification side of the first lens group.

A projection-type display apparatus of the present invention is a projection-type display apparatus comprising:

a light source;
a light valve;
an illumination optical unit that guides rays of light from the light source to the light valve; and
a projection lens according to one of aspects of the present invention, wherein the rays of light from the light source are optically modulated by the light valve and projected onto a screen by the projection lens.

Here, the term "magnification side" refers to a side (screen side) onto which an image or the like is projected. In reduction projection, the screen side is also referred to as the magnification side, for convenience. Further, the term "reduction side" refers to an original image display area side (light valve side). In reduction projection, the light valve side is also referred to as the reduction side, for convenience.

In a projection lens of the present invention and a projection-type display apparatus of the present invention using the projection lens, the projection lens is composed of three groups of a positive lens group, a negative lens group and a positive lens group. Further, the projection lens is structures so as to satisfy the aforementioned formulas (1) and (2).

The projection lens of the present invention and the projection-type display apparatus of the present invention using the projection lens satisfy the formula (1), as described. Therefore, it is possible to prevent the length of the entire system from becoming too long, while structuring the projection lens in such a manner that a ray separation optical system, a ray combination optical system, or the like is insertable in an area between the second lens group and the third lens group. The ray separation optical system separates illumination light and projection light from each other, and the ray combination optical system combines rays from plural modulation elements together. Specifically, in the projection lens of the present invention, a space for inserting an optical prism is provided between the second lens group and the third lens group in the lens system. Further, the projection lens of the present invention is structured so that a light valve is arrangeable without leaving a substantial space on the reduction side of the lens system. Therefore, it is possible to reduce the outer diameter of at least one reduction-side lens in the projection lens.

Further, since the projection lens of the present invention satisfies the formula (2), it is possible to reduce the outer diameter of at least one magnification-side lens in the projection lens, while the reduction side of the lens system is kept telecentric. In other words, when the formula (2) is satisfied, it is possible to limit the sum of the length of the first lens group and the length of the second lens group. Further, since the upper limit of $d_{23}/f_3$ is defined by the formula (1), it is possible to reduce the length of the entire lens, and to reduce the size of the projection lens. Further, when the formula (2) is satisfied, length ff from the most-magnification-side surface in the entire system to the magnification-side focus position of the entire system is extremely short. Further, since the reduction side of the lens system is telecentric, a front-side focus position, at which rays condense most, is located in the vicinity of a magnification-side lens. Therefore, it is possible to solve the problem in conventional techniques that the external diameter of the magnification-side lens should be reduced. Further, it is possible to reduce the size of the entire lens system.

BRIEF DESCRIPTION OF THE DRAWINGS

FIG. 7-*i* is a diagram illustrating the spherical aberration of the projection lens in Example 1 (72.0 times magnification);

FIG. 7-*ii* is a diagram illustrating the astigmatism of the projection lens in Example 1 (72.0 times magnification);

FIG. 7-*iii* is a diagram illustrating the distortion of the projection lens in Example 1 (72.0 times magnification);

FIG. 7-*iv* is a diagram illustrating the lateral chromatic aberration of the projection lens in Example 1 (72.0 times magnification);

FIG. 8-*i* is a diagram illustrating the spherical aberration of the projection lens in Example 2 (72.0 times magnification);

FIG. 8-*ii* is a diagram illustrating the astigmatism of the projection lens in Example 2 (72.0 times magnification);

FIG. 8-*iii* is a diagram illustrating the distortion of the projection lens in Example 2 (72.0 times magnification);

FIG. 8-*iv* is a diagram illustrating the lateral chromatic aberration of the projection lens in Example 2 (72.0 times magnification);

FIG. 9-*i* is a diagram illustrating the spherical aberration of the projection lens in Example 3 (72.0 times magnification);

FIG. 9-*ii* is a diagram illustrating the astigmatism of the projection lens in Example 3 (72.0 times magnification);

FIG. 9-*iii* is a diagram illustrating the distortion of the projection lens in Example 3 (72.0 times magnification);

FIG. 9-*iv* is a diagram illustrating the lateral chromatic aberration of the projection lens in Example 3 (72.0 times magnification);

FIG. 10-*i* is a diagram illustrating the spherical aberration of the projection lens in Example 4 (72.0 times magnification);

FIG. 10-*ii* is a diagram illustrating the astigmatism of the projection lens in Example 4 (72.0 times magnification);

FIG. 10-*iii* is a diagram illustrating the distortion of the projection lens in Example 4 (72.0 times magnification);

FIG. 10-*iv* is a diagram illustrating the lateral chromatic aberration of the projection lens in Example 4 (72.0 times magnification);

FIG. 11-*i* is a diagram illustrating the spherical aberration of the projection lens in Example 5 (72.0 times magnification);

FIG. 11-*ii* is a diagram illustrating the astigmatism of the projection lens in Example 5 (72.0 times magnification);

FIG. 11-*iii* is a diagram illustrating the distortion of the projection lens in Example 5 (72.0 times magnification);

FIG. 11-*iv* is a diagram illustrating the lateral chromatic aberration of the projection lens in Example 5 (72.0 times magnification);

FIG. 12-*i* is a diagram illustrating the spherical aberration of the projection lens in Example 6 (72.0 times magnification);

FIG. 12-*ii* is a diagram illustrating the astigmatism of the projection lens in Example 6 (72.0 times magnification);

FIG. 12-*iii* is a diagram illustrating the distortion of the projection lens in Example 6 (72.0 times magnification);

FIG. 12-*iv* is a diagram illustrating the lateral chromatic aberration of the projection lens in Example 6 (72.0 times magnification);

FIG. 13 is a conceptual diagram of an optical system using a transmissive LCD panel (three panel type for RGB) and a cross dichroic prism in an embodiment of the present invention;

FIG. 14 is a conceptual diagram of an optical system using a reflective LCD panel (single panel type) and a PBS prism in an embodiment of the present invention;

DESCRIPTION OF THE PREFERRED EMBODIMENTS

Figure 1:
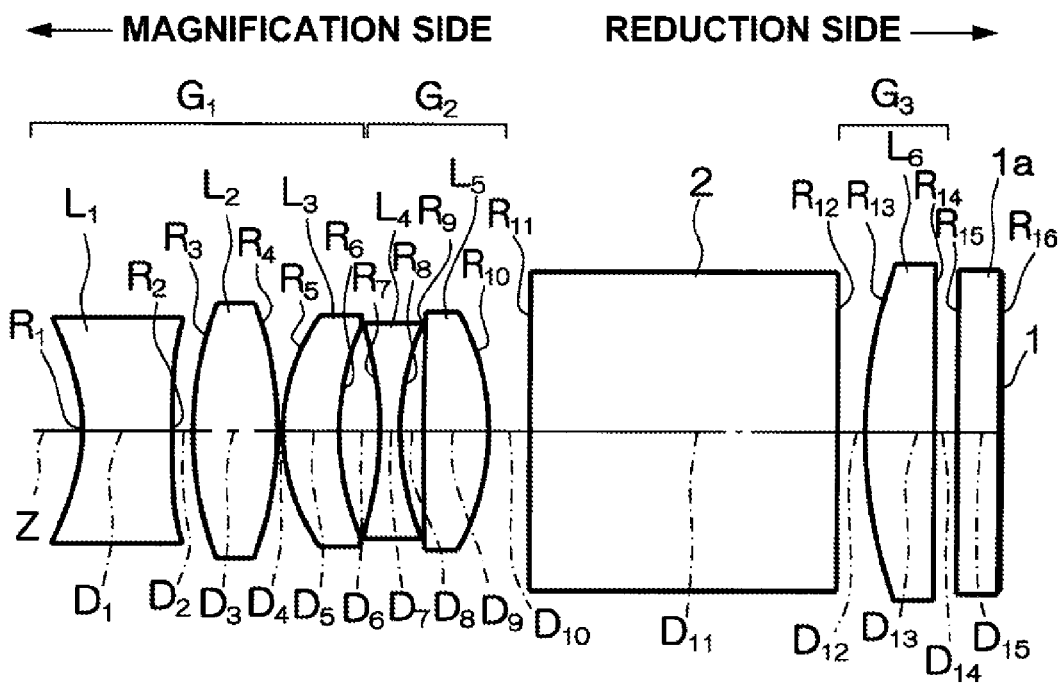
FIG. 1 is a diagram illustrating the structure of a projection lens in Example 1.

Hereinafter, embodiments of the present invention will be described with reference to drawings. FIG. 1 is a diagram illustrating the basic structure of a projection lens in Example 1 of the present invention. Embodiments of the present invention will be described using the projection lens illustrated in FIG. 1 as an example.

The projection lens includes first lens group $G_1$ having positive refractive power, second lens group $G_2$ having negative refractive power, and third lens group $G_3$ having positive refractive power, which are sequentially arranged from the magnification side of the projection lens. Further, the reduction side of the projection lens is telecentric, and at least the following formulas (1) and (2) are satisfied:

$$0.30 \leq d_{23}/f_3 \leq 0.65 \qquad (1); \text{ and}$$

$$10 \leq |D_{12}/\text{ff}| \qquad (2), \text{ where}$$

$d_{23}$: space in air between the second lens group $G_2$ and the third lens group $G_3$, $f_3$: focal length of the third lens group $G_3$, $D_{12}$: total length of the first lens group $G_1$ and the second lens group $G_2$ in the direction of an optical axis, and ff: length from the most magnification-side surface in the entire system of the projection lens to a magnification-side focus position of the entire system.

The formula (1) represents the basic form of the projection lens according to the present embodiment, in which a space for inserting an optical prism is provided between the second lens group $G_2$ and the third lens group $G_3$. When the formula (1) is satisfied, it is possible to prevent the length of the entire system from becoming too long, while structuring the projection lens in such a manner that a ray separation optical system, a ray combination optical system, or the like is insertable in a space between the second lens group $G_2$ and the third lens group $G_3$. The ray separation optical system separates illumination light and projection light from each other, and the ray combination optical system combines rays from plural modulation elements together. Further, since the back side of the third lens group $G_3$ can be reduced, it is possible to reduce the external diameter of at least one reduction-side lens. When the value of $d_{23}/f_3$ exceeds the upper limit defined by the formula (1), the length of the entire lens system becomes too long. When the value of $d_{23}/f_3$ is lower than lower limit defined by the formula (1), it becomes difficult to insert the ray separation optical system for separating illumination light and projection light from each other, the ray combination optical system for combining rays from plural modulation elements together, or the like.

Therefore, it is desirable that the following formula (1') is satisfied instead of the formula (1):

$$0.30 \leq d_{23}/f_3 \leq 0.55 \qquad (1').$$

Further, when the formula (2) is satisfied, length ff from the most-magnification-side surface in the entire system to the magnification-side focus position of the entire system is extremely short. Further, since the reduction side of the lens system is telecentric, a front-side focus position, at which rays condense most, is located in the vicinity of a magnification-side lens. Therefore, when the formula (2) is satisfied, it is possible to reduce the external diameter of at least one magnification-side lens. Hence, it is possible to reduce the size of the entire lens system. Further, when the formula (2) is satisfied, the sum of the length of the first lens group $G_1$ and the length of the second lens group $G_2$ is suppressed. Therefore, it is possible to reduce the length of the entire lens system. Accordingly, it is possible to reduce the size of the entire lens system (compact lens system).

Therefore, it is more desirable that the following formula (2') is satisfied instead of the formula (2), and it is even more desirable that the following formula (2") is satisfied:

$$15 \leq |D_{12}/\text{ff}| \qquad (2'); \text{ where}$$

$$30 \leq |D_{12}/\text{ff}| \qquad (2'').$$

Further, it is desirable that the first lens group $G_1$ is composed of negative lens $G_{11}$ (first lens $L_1$), positive lens $G_{12}$ (second lens $L_2$), and positive lens $G_{13}$ (third lens $L_3$), which are sequentially arranged from the magnification side (please refer to Examples 1, 2, 4 and 5). Alternatively, it is desirable that the first lens group $G_1$ is composed of negative lens $G_{11}$ (first lens $L_1$) and positive lens $G_{12}$ (second lens $L_2$), which are sequentially arranged from the magnification side (please refer to Examples 3 and 6).

Further, it is desirable that the second lens group $G_2$ is composed of negative lens $G_{21}$ (fourth lens $L_4$ in Examples 1, 2, 4 and 5, and third lens $L_3$ in Examples 3 and 6) and positive lens $G_{22}$ (fifth lens $L_5$ in Examples 1, 2, 4 and 5, and fourth lens $L_4$ in Examples 3 and 6).

Further, it is desirable that the third lens group $G_3$ consists of positive lens $G_{31}$, in other words, the third lens group $G_3$ is composed of only positive lens $G_{31}$ (sixth lens $L_6$ in Examples 1, 2, 4 and 5, and fifth lens $L_5$ in Examples 3 and 6).

Further, it is desirable that illumination light and projection light are separated from each other, or rays from plural spatial modulation elements are combined together in an area between the second lens group $G_2$ and the third lens group $G_3$.

Further, it is desirable that a stop (or a mask) is arranged on the magnification side of the first lens group $G_1$. Alternatively, in the first lens group $G_1$, a spot (or a mask) may be arranged between the most-magnification-side lens (lens $G_{11}$) and a second lens from the magnification side (lens $G_{12}$).

Specific lens shape or the like will be described later in each example.

Further, a filter 1a, such as an infrared-ray-cut filter or a low-pass filter, is arranged between the third lens group $G_3$ and an image display plane 1. Further, a glass block (optical prism) 2 is arranged between the second lens group $G_2$ and the third lens group $G_3$. The glass block 2 corresponds to a ray separation optical system or a ray combination optical system. In FIG. 1, line Z represents an optical axis.

As the glass block (optical prism) 2 arranged between the second lens group $G_2$ and the third lens group $G_3$, various types of glass block including those illustrated in FIGS. 13 through 16 may be used for example.

Specifically, for example, as illustrated in FIG. 13, rays of light are modulated by transmissive liquid crystal panels corresponding to light of three colors, respectively. Further, rays of light of respective colors are output from image display planes 1B, 1G, and 1R of the transmissive liquid crystal panels, respectively, and pass through third lens groups $G_3$ corresponding to the three colors, respectively. After then, the rays of light of different colors are combined together by a cross dichroic prism 2a, which is inserted between the third lens groups $G_3$ and the second lens group $G_2$. The combined light passes through the second lens group $G_2$ and the first lens group $G_1$, and is projected onto a screen, which is not illustrated.

Alternatively, for example, as illustrated in FIG. 14, a PBS prism 2b may be inserted between the third lens group $G_3$ and the second lens group $G_2$. The PBS prism 2b deflects, toward the direction of image display plane 1P of a reflective liquid crystal display panel, illumination light entering from a direction perpendicular to optical axis Z. Further, the PBS prism 2b passes modulation light output from the image display plane 1P of the reflective liquid crystal display panel straight along the optical axis Z. Accordingly, the PBS prism 2b separates the illumination light and the modulation light from each other. The separated modulation light passes through the second lens group $G_2$ and the first lens group $G_1$, and is projected onto a screen, which is not illustrated.

Figure 15:
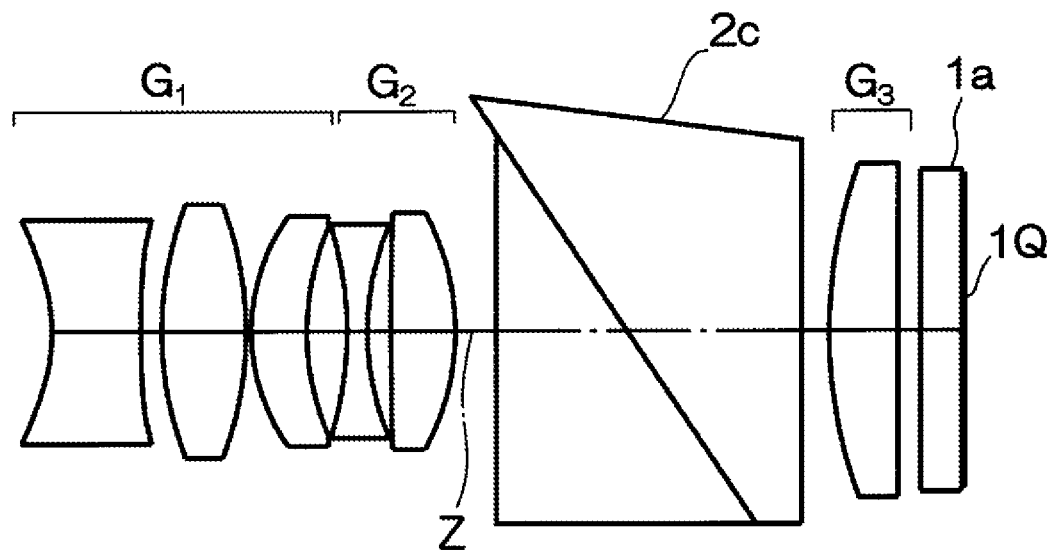
FIG. 15 is a conceptual diagram of an optical system using a DMD display panel and a TIR prism in an embodiment of the present invention.

Alternatively, for example, as illustrated in FIG. 15, a TIR prism 2c may be inserted between the third lens group $G_3$ and the second lens group $G_2$. The TIR prism 2c deflects, toward the direction of image display plane 1Q of a DMD display panel, illumination light entering from an oblique lower direction with respect to optical axis Z. Further, the TIR prism 2c passes modulation light output from the image display plane 1Q of the DMD display panel travel straight along the optical axis Z. Accordingly, the TIR prism 2c separates the illumination light and the modulation light from each other. The separated modulation light passes through the second lens group $G_2$ and the first lens group $G_1$, and is projected onto a screen, which is not illustrated.

Figure 16:
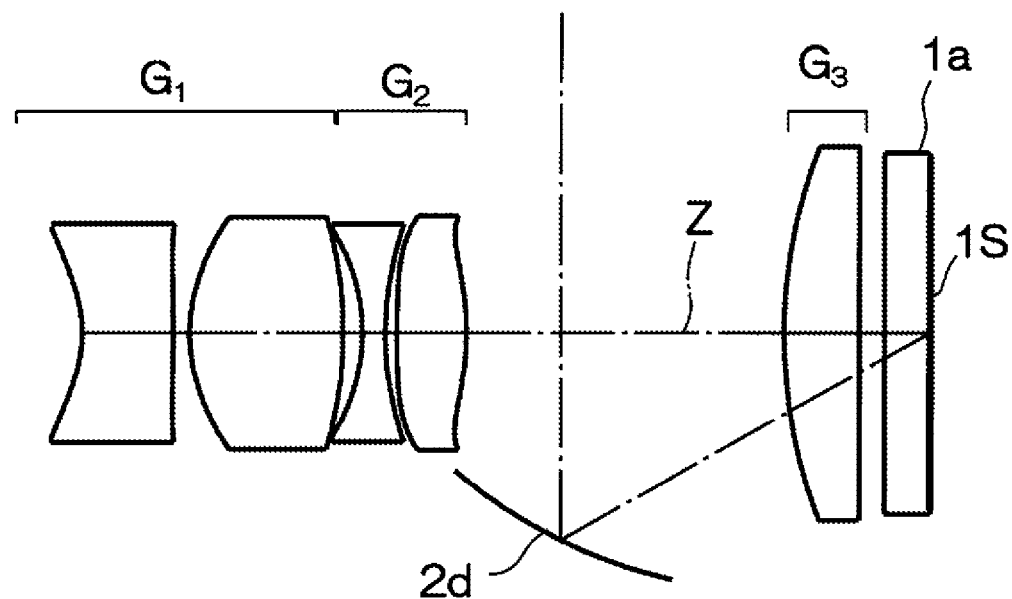
FIG. 16 is a conceptual diagram of an optical system using a DMD display panel and a mirror in an embodiment of the present invention.

Alternatively, for example, as illustrated in FIG. 16, a concave mirror 2d may be inserted, at a position away from optical axis Z, between the third lens group $G_3$ and the second lens group $G_2$. The concave mirror 2d deflects, toward the direction of image display plane 1S of a DMD display panel, illumination light entering from a direction perpendicular to the optical axis Z. Further, the concave mirror 2d allows modulation light output from the image display plane 1S of the DMD display panel travel straight along the optical axis Z. Accordingly, the concave mirror 2d separates the illumination light and the modulation light from each other. The separated modulation light passes through the second lens group $G_2$ and the first lens group $G_1$, and is projected onto a screen, which is not illustrated.

Further, in the embodiments of the present invention, each aspheric surface is represented by the following equation:

$$Z = \frac{Y^2/R}{1+\sqrt{1-K \times Y^2/R^2}} + \sum_{i=3}^{12} A_i Y^i, \quad \text{[Equation 1]}$$

where

Z: length of a perpendicular from a point on an aspheric surface, the point away from optical axis by distance Y, to flat plane (flat plane perpendicular to the optical axis) in contact with the vertex of the aspheric surface, Y: distance from the optical axis, R: curvature radius of the aspheric surface in the vicinity of the optical axis, K: eccentricity, and $A_i$: aspheric coefficient (i=3 through 12).

In the embodiments of the present invention, the formulas (1) and (2) are satisfied. Further, it is desirable that at least one of the following formulas (3) through (7) is satisfied:

$$bf/f_3 \leq 0.2 \quad (3);$$

$$1.2 \leq f_3/f \leq 1.9 \quad (4);$$

$$0.4 \leq D_{12}/f_3 \leq 1.1 \quad (5);$$

$$0.2 \leq f_1/f \leq 1.0 \quad (6); \text{ and}$$

$$-3.5 \leq f_2/f \leq -0.5 \quad (7), \text{ where}$$

bf: back focus in air of the entire system,
f: focal length of the entire system,
$f_1$: focal length of the first lens group $G_1$,
$f_2$: focal length of the second lens group $G_2$,
$f_3$: focal length of the third lens group $G_3$, and
$D_{12}$: the total length of the first lens group $G_1$ and the second lens group $G_2$ in the direction of the optical axis.

Next, the technical meanings of the formulas (3) through (7) will be described.

The formula (3) defines the range of a value obtained by dividing the back focus bf in air of the entire system by focal length $f_3$ of the third lens group $G_3$. The formula (3) defines the range for reducing the size of the lens group $G_3$. In other words, when the value exceeds the upper limit defined by the formula (3), it becomes difficult to reduce the size of the third lens group $G_3$.

Therefore, it is more desirable that the following formula (3') is satisfied instead of the formula (3):

$$bf/f_3 \leq 0.15 \quad (3').$$

Further, the formula (4) defines the range of a value obtained by dividing the focal length $f_3$ of the third lens group $G_3$ by the focal length f of the entire system. The formula (4) defines a range in which the size of the second lens group G2 is reducible while correction of aberration, such as image plane correction, is performed in an excellent manner. In other words, when the value exceeds the upper limit defined by the formula (4), the total length of the second lens group $G_2$ becomes too long, and it becomes difficult to reduce the size of the lens system. When the value is lower than the lower limit defined by the formula (4), the power of the third lens group $G_3$ becomes too strong, and it becomes difficult to perform correction of aberration, such as image plane correction.

Therefore, it is more desirable that the following formula (4') is satisfied instead of the formula (4):

$$1.3 \leq f_3/f \leq 1.7 \quad (4').$$

Further, the formula (5) defines the range of a value obtained by dividing the total length $D_{12}$ of the first lens group $G_1$ and the second lens group $G_2$ in the direction of the optical axis by the focal length $f_3$ of the third lens group $G_3$. When the formula (5) is satisfied, the total length $D_{12}$ of the first lens group $G_1$ and the second lens group $G_2$ does not become too short, and aberrations are corrected in an excellent manner. Further, the total length $D_{12}$ of the first lens group $G_1$ and the second lens group $G_2$ does not become too long. Therefore, it is possible to reduce the size of the lens system. In other words, when the value exceeds the upper limit defined by the formula (5), the total length of the first lens group $G_1$ and the second lens group $G_2$ becomes too long. Further, when the value is lower than the lower limit defined by the formula (5), the total length of the first lens group $G_1$ and the second lens group $G_2$ becomes too short, and it becomes difficult to perform correction of aberration, such as image plane correction.

Therefore, it is desirable that the following formula (5') is satisfied instead of the formula (5):

$$0.5 \leq D_{12}/f_3 \leq 0.9 \quad (5').$$

Further, the formula (6) defines the range of a value obtained by dividing the focal length $f_1$ of the first lens group $G_1$ by the focal length f of the entire system. The formula (6) defines a range in which the size of the first lens group $G_1$ is reducible while chromatic aberration is corrected in an excellent manner. In other words, when the value exceeds the upper limit defined by the formula (6), the total length of the first lens group $G_1$ becomes too long, and it becomes difficult to reduce the size of the entire system. When the value is lower than the lower limit defined by the formula (6), the power of the first lens group $G_1$ becomes too strong, and it becomes difficult to correct aberrations, such as chromatic aberration.

Therefore, it is more desirable that the following formula (6') is satisfied instead of the formula (6), and it is even more desirable that the following formula (6") is satisfied:

$$0.3 \leq f_1/f \leq 0.8 \qquad (6'); \text{ and}$$

$$0.4 \leq f_1/f \leq 0.7 \qquad (6'').$$

Further, the formula (7) defines the range of a value obtained by dividing the focal length $f_2$ of the second lens group $G_2$ by the focal length $f$ of the entire system. The formula (7) defines a range in which the size of the second lens group $G_2$ is reducible while various kinds of aberration are corrected in an excellent manner. In other words, when the value exceeds the upper limit defined by the formula (7), the power of the second lens group $G_2$ becomes too strong, and it becomes difficult to correct various kinds of aberration. When the value is lower than the lower limit defined by the formula (7), the total length of the second lens group $G_2$ becomes too long, and it becomes difficult to reduce size of the entire system.

Therefore, it is desirable that the following formula (7') is satisfied instead of the formula (7), and it is more desirable that the following formula (7") is satisfied:

$$-3.0 \leq f_2/f \leq -0.7 \qquad (7'); \text{ and}$$

$$-2.5 \leq f_2/f \leq -0.8 \qquad (7'').$$

Figure 17:
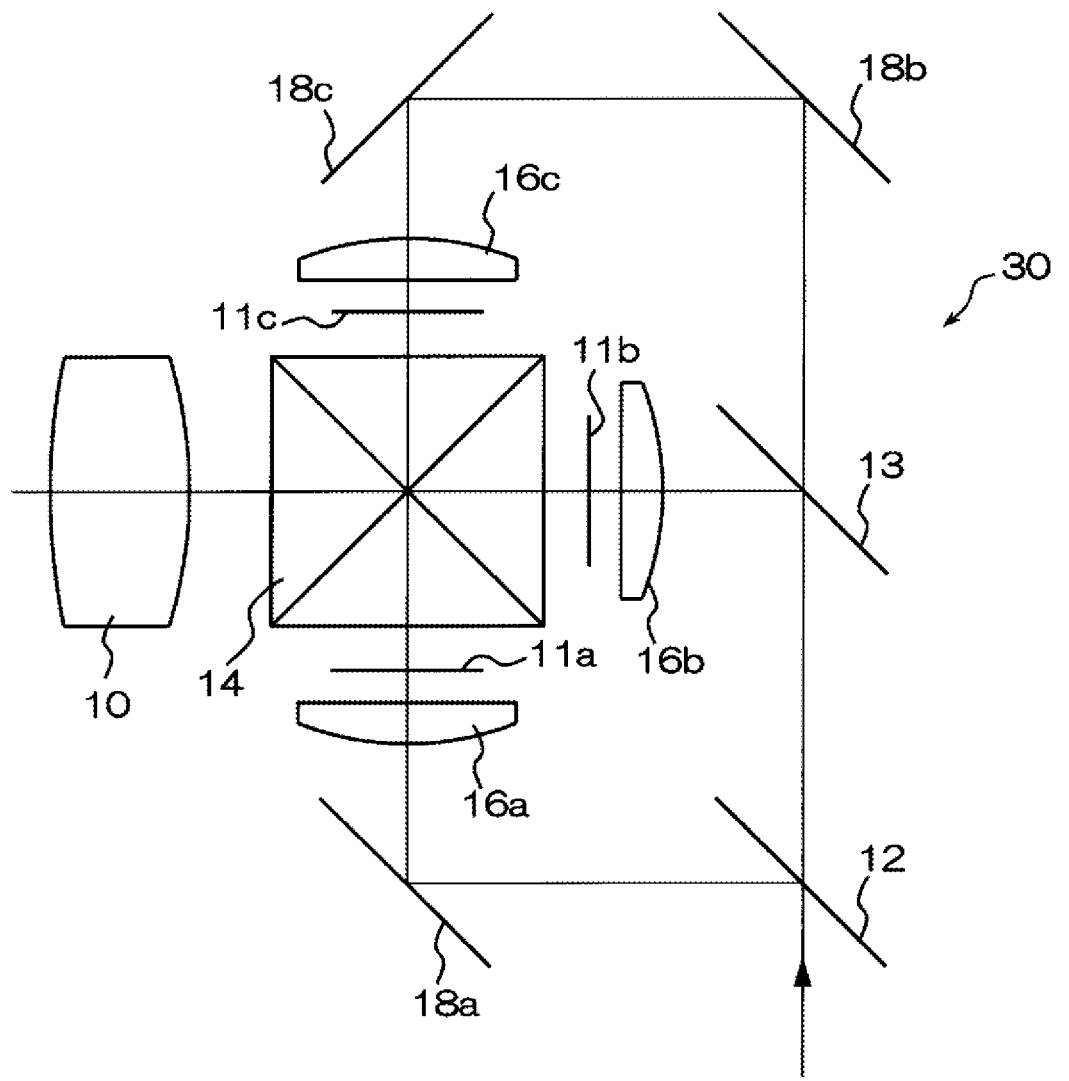
FIG. 17 is a schematic diagram illustrating the structure of a projection-type display apparatus according to an embodiment of the present invention.

Next, with reference to FIG. 17, an example of a projection-type display apparatus on which the projection lens of the present invention is mounted will be described. A projection-type display apparatus 30 illustrated in FIG. 17 includes transmissive liquid crystal panels 11*a* through 11*c*, as light valves. Further, the projection-type display apparatus 30 uses, as a projection lens 10, a projection lens according to the aforementioned embodiments of the present invention. In FIG. 17, a light source 15 and a dichroic mirror 12 are not illustrated. White light is output from the light source 15, and enters, through an illumination optical unit, liquid crystal panels 11*a* through 11*c*, which correspond to rays of light of three colors (G light, B light and R light), respectively, and is optically modulated. The modulated rays of light are combined together by the cross dichroic prism 14, and projected by the projection lens 10 onto a screen, which is not illustrated. Further, the projection-type display apparatus 30 includes condenser lenses 16*a* through 16*c* and total reflection mirrors 18*a* through 18*c*.

The projection-type display apparatus 30 according to an embodiment of the present invention uses the projection lens in which the size of the entire system has been reduced. Therefore, it is possible to reduce the whole size of the projection-type display apparatus 30.

It is not necessary that the projection lens of the present invention uses, as light valves, transmissive liquid crystal display panels. The projection lens of the present invention may be used, as a projection lens, in a apparatus using a reflective liquid crystal display panel or other optical modulation means, such as a DMD.

EXAMPLES

Next, examples of the present invention will be specifically described by using data.

Example 1

A projection lens in Example 1 is structured as illustrated in FIG. 1. Specifically, the projection lens is composed of first lens group $G_1$, second lens group $G_2$, and third lens group $G_3$, which are sequentially arranged from the magnification side of the projection lens. The first lens group $G_1$ is composed of first lens $L_1$, second lens $L_2$ and third lens $L_3$, which are sequentially arranged from the magnification side. Both surfaces of the first lens $L_1$ are aspheric (double concave (concave-concave) in the vicinity of the optical axis), and the first lens $L_1$ is made of plastic. The second lens $L_2$ is a double convex (convex-convex) lens made of glass. The third lens $L_3$ is a positive meniscus lens having a convex surface facing the magnification side. The second lens group $G_2$ is composed of fourth lens $L_4$ and fifth lens $L_5$. The fourth lens $L_4$ is a double concave lens, and the fifth lens $L_5$ is a double convex lens. The third lens group $G_3$ is composed of sixth lens $L_6$, which is a plano-convex lens having a convex surface facing the magnification side.

Further, a wide space (sufficiently long distance) is maintained between the second lens group $G_2$ and the third lens group $G_3$, and a color combination prism (or a ray separation prism) 2 is arranged in the space between the second lens group $G_2$ and the third lens group $G_3$. The space between the second lens group $G_2$ and the third lens group $G_3$ is set so as to satisfy the range defined by the formula (1). Specifically, the value of $d_{23}/f_3$ is 0.43 in Example 1.

Further, both surfaces of the first lens $L_1$ in Example 1 are aspheric surfaces represented by the aforementioned aspheric surface equation (Equation 1).

Table 1 shows data about Example 1. Table 1 shows the curvature radius R of each lens surface (normalized by assuming the focal length of the entire lens system to be 1.00; same in the following tables), the center thickness D of each lens and air space D between lenses (normalized in a manner similar to the curvature radius R, same in the following tables), and refractive index $N_d$ and Abbe number $\nu_d$ of each lens for d-line. In Table 1, and Tables 3, 5, 7, 9 and 11, which will be described later, surface numbers for each sign R, D, $N_d$, and $\nu_d$ sequentially increase from the magnification side.

Further, at the top of Table 1, and Tables 3, 5, 7, 9 and 11, which will be described later, focal length f of the entire system, half angle ω of view, and FNo (f-number) are shown.

As described above, both surfaces of the first lens $L_1$ are aspheric. Table 2 shows aspheric coefficients K, $A_3$, $A_4$, $A_5$, $A_6$, $A_7$, $A_8$, $A_9$, $A_{10}$, $A_{11}$, and $A_{12}$ in the equation representing the aspheric surfaces for these aspheric surfaces.

TABLE 1

| SURFACE NUMBER | CURVATURE RADIUS R | DISTANCE D | REFRACTIVE INDEX $N_d$ | ABBE NUMBER $\nu_d$ |
|---|---|---|---|---|
| f: 1.00, HALF ANGLE OF VIEW ω: 22.9°, FNo.: 1.97 | | | | |
| OBJ | ∞ | 71.921 | | |
| 1* | −0.447 | 0.234 | 1.510100 | 56.2 |
| 2* | 9.095 | 0.054 | | |
| 3 | 0.942 | 0.221 | 1.800000 | 48.0 |
| 4 | −0.962 | 0.014 | | |
| 5 | 0.530 | 0.147 | 1.800000 | 48.0 |
| 6 | 0.708 | 0.106 | | |
| 7 | −0.938 | 0.054 | 1.846700 | 23.8 |
| 8 | 0.734 | 0.062 | | |
| 9 | 12.068 | 0.170 | 1.724000 | 55.3 |
| 10 | −0.663 | 0.108 | | |
| 11 | ∞ | 0.806 | 1.516300 | 64.1 |
| 12 | ∞ | 0.072 | | |
| 13 | 1.327 | 0.180 | 1.806100 | 40.9 |
| 14 | ∞ | 0.060 | | |
| 15 | ∞ | 0.108 | 1.516300 | 64.1 |
| 16 | ∞ | 0.000 | | |

*ASPHERIC SURFACE

TABLE 2

ASPHERIC COEFFICIENT

| SURFACE NUMBER | K | $A_3$ | $A_4$ | $A_5$ | $A_6$ |
| --- | --- | --- | --- | --- | --- |
| 1 | 1.00000 | 0.00000E+00 | 6.04753E+00 | −4.78664E+00 | −6.07153E+00 |
| 2 | 1.00000 | 0.00000E+00 | 3.71334E+00 | 1.83536E−01 | −1.29130E+01 |

| | $A_7$ | $A_8$ | $A_9$ | $A_{10}$ | $A_{11}$ | $A_{12}$ |
| --- | --- | --- | --- | --- | --- | --- |
| 1 | 4.48877E−01 | 2.01341E+01 | 2.03388E+01 | 1.34286E+02 | 0.00000E+00 | 0.00000E+00 |
| 2 | −1.05036E+01 | 5.31486E+01 | 1.20340E+02 | −2.73790E+02 | 0.00000E+00 | 0.00000E+00 |

Further, FIG. 7-*i* through 7-*iv* are diagrams illustrating aberrations in Example 1. FIG. 7-*i* illustrates spherical aberration in Example 1, and FIG. 7-*ii* illustrates astigmatism in Example 1, and FIG. 7-*iii* illustrates distortion in Example 1, and FIG. 7-*iv* illustrates lateral chromatic aberration in Example 1 (72.0 times magnification). In FIG. 7-*i*, and FIGS. 8-*i*, 9-*i*, 10-*i*, 11-*i* and 12-*i*, which will be described later, spherical aberrations for d-line, F-line and C-line are illustrated. In FIG. 7-*ii*, and FIGS. 8-*ii*, 9-*ii*, 10-*ii*, 11-*ii* and 12-*ii*, which will be described later, aberrations (astigmatism) with respect to sagittal image planes and aberrations with respect to tangential image planes are illustrated. In FIG. 7-*iv*, and FIGS. 8-*iv*, 9-*iv*, 10-*iv*, 11-*iv* and 12-*iv*, which will be described later, lateral chromatic aberrations of F-line and C-line with respect to d-line are illustrated.

As FIG. 7-*i* through 7-*iv* clearly illustrate, each aberration is corrected in an excellent manner in the projection lens of Example 1.

Further, as Table 13 shows, the projection lens of Example 1 satisfies the formulas (1) through (7), formulas (1') through (7') and formulas (2"), (6") and (7").

Example 2

Figure 2:
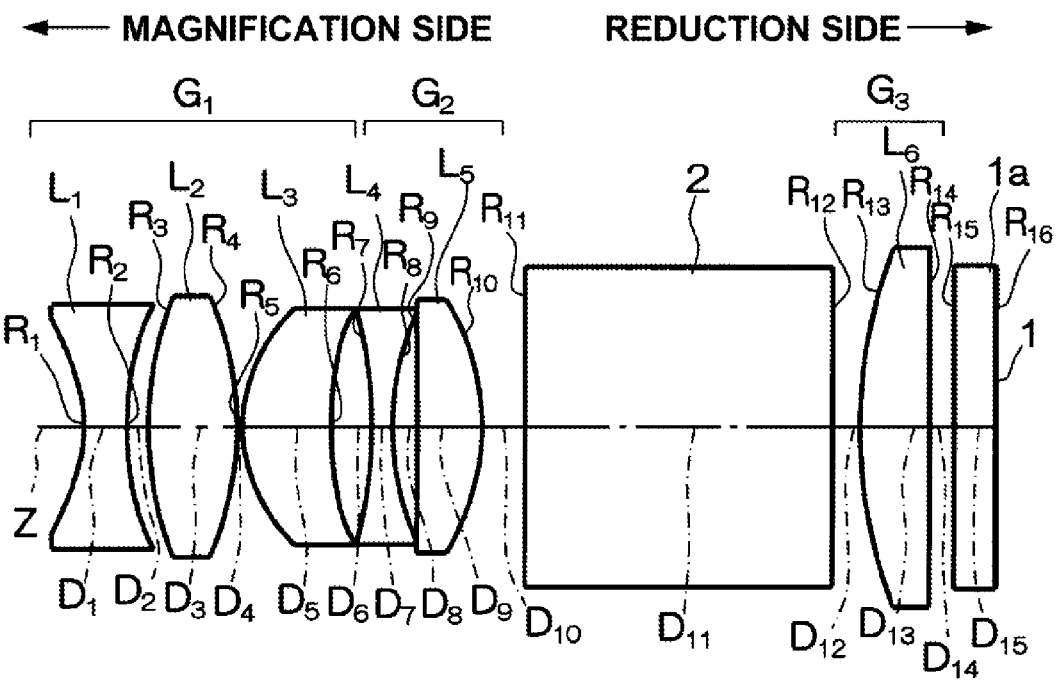
FIG. 2 is a diagram illustrating the structure of a projection lens in Example 2.

FIG. 2 is a schematic diagram illustrating the structure of a projection lens in Example 2. The projection lens in Example 2 is structured in a substantially similar manner to Example 1. However, in the projection lens of Example 2, both surfaces of the third lens $L_3$ in the first lens group $G_1$ are aspheric, and the third lens $L_3$ is made of plastic. Further, in the projection lens of Example 2, the fifth lens $L_5$ in the second lens group $G_2$ is a positive meniscus lens having a convex surface facing the reduction side of the projection lens.

Further, in the projection lens of Example 2, a wide space is maintained between the second lens group $G_2$ and the third lens group $G_3$, and a color combination prism (or a ray separation prism) 2 is arranged in the space between the second lens group $G_2$ and the third lens group $G_3$. The space between the second lens group $G_2$ and the third lens group $G_3$ is set so as to satisfy the range defined by the formula (1). Specifically, the value of $d_{23}/f_3$ is 0.43 in Example 2.

Table 3 shows data about Example 2. Table 3 shows the curvature radius R of each lens surface, the center thickness D of each lens and air space D between lenses, and refractive index $N_d$ and Abbe number $v_d$ of each lens for d-line.

As described above, both surfaces of the first lens $L_1$ and both surfaces of the third lens $L_3$ are aspheric. Table 4 shows aspheric coefficients K, $A_3$, $A_4$, $A_5$, $A_6$, $A_7$, $A_8$, $A_9$, $A_{10}$, $A_{11}$, and $A_{12}$ in the equation representing aspheric surfaces for these aspheric surfaces.

TABLE 3 f: 1.00, HALF ANGLE OF VIEW ω: 22.9°, FNo.: 1.94

| SURFACE NUMBER | CURVATURE RADIUS R | DISTANCE D | REFRACTIVE INDEX $N_d$ | ABBE NUMBER $v_d$ |
| --- | --- | --- | --- | --- |
| OBJ | ∞ | 71.970 | | |
| 1* | −0.378 | 0.113 | 1.510100 | 56.2 |
| 2* | 1.051 | 0.055 | | |
| 3 | 0.961 | 0.231 | 1.772500 | 49.6 |
| 4 | −0.873 | 0.014 | | |
| 5* | 0.395 | 0.231 | 1.510100 | 56.2 |
| 6* | 1.111 | 0.107 | | |
| 7 | −1.199 | 0.054 | 1.846700 | 23.8 |
| 8 | 0.758 | 0.065 | | |
| 9 | −40.493 | 0.170 | 1.713000 | 53.9 |
| 10 | −0.649 | 0.113 | | |
| 11 | ∞ | 0.806 | 1.516300 | 64.1 |
| 12 | ∞ | 0.072 | | |
| 13 | 1.345 | 0.180 | 1.806100 | 40.9 |
| 14 | ∞ | 0.065 | | |
| 15 | ∞ | 0.108 | 1.516300 | 64.1 |
| 16 | ∞ | 0.000 | | |

*ASPHERIC SURFACE

TABLE 4

ASPHERIC COEFFICIENT

| SURFACE NUMBER | K | $A_3$ | $A_4$ | $A_5$ | $A_6$ |
| --- | --- | --- | --- | --- | --- |
| 1 | 1.00000 | 0.00000E+00 | 8.90517E+00 | −7.02839E+00 | −2.94483E+01 |
| 2 | 1.00000 | 0.00000E+00 | 2.19881E+00 | 3.82460E+00 | −3.10533E+01 |
| 5 | 1.00000 | 0.00000E+00 | −1.92764E+00 | 0.00000E+00 | −1.93526E−01 |
| 6 | 1.00000 | 0.00000E+00 | 8.85900E−01 | 0.00000E+00 | 3.60196E+00 |

| | $A_7$ | $A_8$ | $A_9$ | $A_{10}$ | $A_{11}$ | $A_{12}$ |
| --- | --- | --- | --- | --- | --- | --- |
| 1 | 8.62994E+01 | 6.80710E+01 | −6.14184E+02 | 1.59187E+03 | 0.00000E+00 | 0.00000E+00 |
| 2 | 6.51130E+00 | 1.50600E+02 | 4.15040E+01 | −5.63815E+02 | 0.00000E+00 | 0.00000E+00 |
| 5 | 0.00000E+00 | 9.26357E+00 | 0.00000E+00 | −1.55993E+02 | 0.00000E+00 | 0.00000E+00 |
| 6 | 0.00000E+00 | −5.96285E+01 | 0.00000E+00 | 1.59689E+03 | 0.00000E+00 | 0.00000E+00 |

Further, FIG. 8-*i* through 8-*iv* are diagrams illustrating aberrations in Example 2. FIG. 8-*i* illustrates spherical aberration in Example 2, and FIG. 8-*ii* illustrates astigmatism in Example 2, and FIG. 8-*iii* illustrates distortion in Example 2, and FIG. 8-*iv* illustrates lateral chromatic aberration in Example 2 (72.0 times magnification).

As FIG. 8-*i* through 8-*iv* clearly illustrate, each aberration is corrected in an excellent manner in the projection lens of Example 2.

Further, as Table 13 shows, the projection lens in Example 2 satisfies the formulas (1) through (7), formulas (1') through (7') and formulas (2"), (6") and (7").

Example 3

Figure 3:
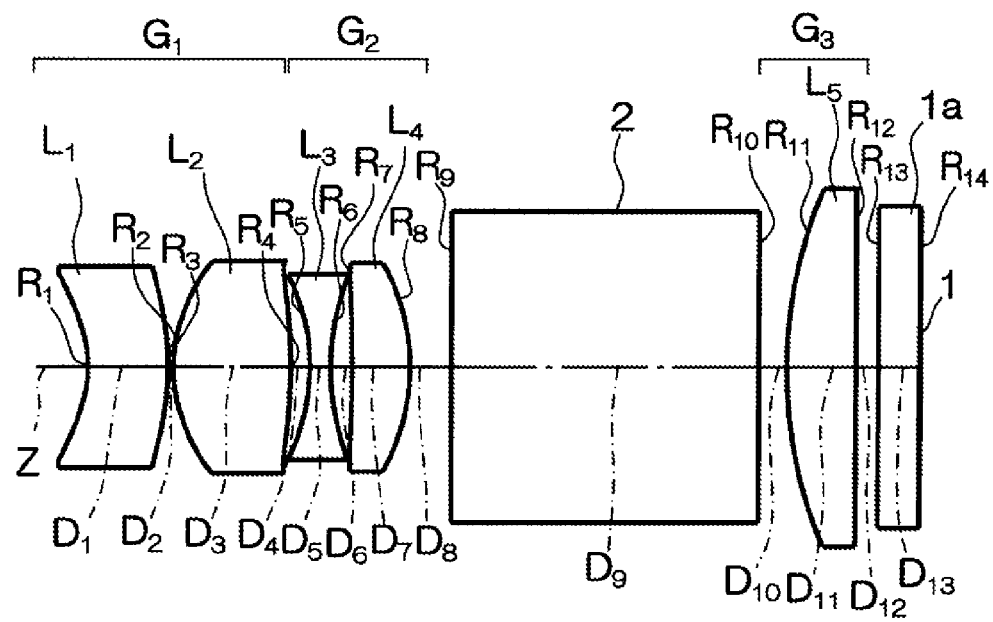
FIG. 3 is a diagram illustrating the structure of a projection lens in Example 3.

FIG. 3 is a schematic diagram illustrating the structure of a projection lens in Example 3. The projection lens in Example 3 is structured in a similar manner to Example 1. However, Example 3 greatly differs from Example 1 in that the projection lens of Example 3 is composed of five lenses. Specifically, the projection lens of Example 3 is composed of first lens group $G_1$, second lens group $G_2$ and third lens group $G_3$, which are sequentially arranged from the magnification side. The first lens group $G_1$ is composed of first lens $L_1$ and second lens $L_2$, which are sequentially arranged from the magnification side. Both surfaces of the first lens $L_1$ are aspheric, and the first lens $L_1$ is made of plastic (negative meniscus lens shape having a concave surface facing the magnification side in the vicinity of the optical axis). Both surfaces of the second lens $L_2$ are aspheric, and the second lens $L_2$ is made of plastic (double convex lens shape in the vicinity of the optical axis). Further, the second lens group $G_2$ is composed of third lens $L_3$ and fourth lens $L_4$, which are sequentially arranged from the magnification side. The third lens $L_3$ is a double concave lens, and the fourth lens $L_4$ is a positive meniscus lens having a convex surface facing the reduction side. The third lens group $G_3$ is composed of fifth lens $L_5$, which is a plano-convex lens having a convex surface facing the magnification side.

Further, in the projection lens of Example 3, a wide space is maintained between the second lens group $G_2$ and the third lens group $G_3$, and a color combination prism (or a ray separation prism) 2 is arranged in the space between the second lens group $G_2$ and the third lens group $G_3$. The space between the second lens group $G_2$ and the third lens group $G_3$ is set so as to satisfy the range defined by the formula (1). Specifically, the value of $d_{23}/f_3$ is 0.46 in Example 3.

Table 5 shows data about Example 3. Table 5 shows the curvature radius R of each lens surface, the center thickness D of each lens and air space D between lenses, and refractive index $N_d$ and Abbe number $v_d$ of each lens for d-line.

As described above, both surfaces of the first lens $L_1$ and both surfaces of the second lens $L_2$ are aspheric. Table 6 shows aspheric coefficients $K, A_3, A_4, A_5, A_6, A_7, A_8, A_9, A_{10}, A_{11}$, and $A_{12}$ in the equation representing the aspheric surfaces for these aspheric surfaces.

TABLE 5 f: 1.00, HALF ANGLE OF VIEW ω: 22.8°, FNo.: 2.20

| SURFACE NUMBER | CURVATURE RADIUS R | DISTANCE D | REFRACTIVE INDEX $N_d$ | ABBE NUMBER $v_d$ |
|---|---|---|---|---|
| OBJ | ∞ | 72.008 | | |
| 1* | −0.302 | 0.209 | 1.510100 | 56.2 |
| 2* | −0.795 | 0.014 | | |
| 3* | 0.382 | 0.306 | 1.806100 | 40.9 |
| 4* | −1.523 | 0.052 | | |
| 5 | −0.546 | 0.054 | 1.846700 | 23.8 |
| 6 | 0.683 | 0.057 | | |
| 7 | −4.696 | 0.151 | 1.713000 | 53.9 |
| 8 | −0.566 | 0.108 | | |
| 9 | ∞ | 0.806 | 1.516300 | 64.1 |
| 10 | ∞ | 0.072 | | |
| 11 | 1.236 | 0.180 | 1.806100 | 40.9 |
| 12 | ∞ | 0.058 | | |
| 13 | ∞ | 0.108 | 1.516300 | 64.1 |
| 14 | ∞ | 0.000 | | |

*ASPHERIC SURFACE

TABLE 6

ASPHERIC COEFFICIENT

| SURFACE NUMBER | K | $A_3$ | $A_4$ | $A_5$ | $A_6$ |
|---|---|---|---|---|---|
| 1 | 1.00000 | 0.00000E+00 | 1.68585E+01 | 1.54368E+01 | −3.61587E+02 |
| 2 | 1.00000 | 0.00000E+00 | −2.68958E+00 | 2.12197E+01 | −2.62487E+01 |
| 3 | 1.00000 | 0.00000E+00 | −6.17589E+00 | 0.00000E+00 | 7.65939E+01 |
| 4 | 1.00000 | 0.00000E+00 | 1.21943E−01 | 0.00000E+00 | −6.68992E+01 |

| | $A_7$ | $A_8$ | $A_9$ | $A_{10}$ | $A_{11}$ | $A_{12}$ |
|---|---|---|---|---|---|---|
| 1 | 7.91372E+02 | 2.60019E+03 | −2.09846E+03 | −2.59005E+04 | −6.23954E+04 | 3.60917E+05 |
| 2 | 7.76742E+00 | −1.54717E+02 | −7.33772E+02 | 3.06293E+03 | 7.63888E+03 | −2.13085E+04 |
| 3 | −4.34110E+01 | −6.50042E+02 | −1.69836E+02 | 3.23284E+03 | 6.44907E+03 | −1.48743E+04 |
| 4 | 4.31462E+02 | −1.42259E+02 | −8.62794E+02 | −5.01745E+03 | −4.53965E+04 | 2.14070E+05 |

Further, FIG. 9-*i* through 9-*iv* are diagrams illustrating aberrations in Example 3. FIG. 9-*i* illustrates spherical aberration in Example 3, and FIG. 9-*ii* illustrates astigmatism in Example 3, and FIG. 9-*iii* illustrates distortion in Example 3, and FIG. 9-*iv* illustrates lateral chromatic aberration in Example 3 (72.0 times magnification).

As FIG. 9-*i* through 9-*iv* clearly illustrate, each aberration is corrected in an excellent manner in the projection lens of Example 3.

Further, as Table 13 shows, the projection lens in Example 3 satisfies the formulas (1) through (7), formulas (1') through (7') and formulas (6") and (7").

Example 4

Figure 4:
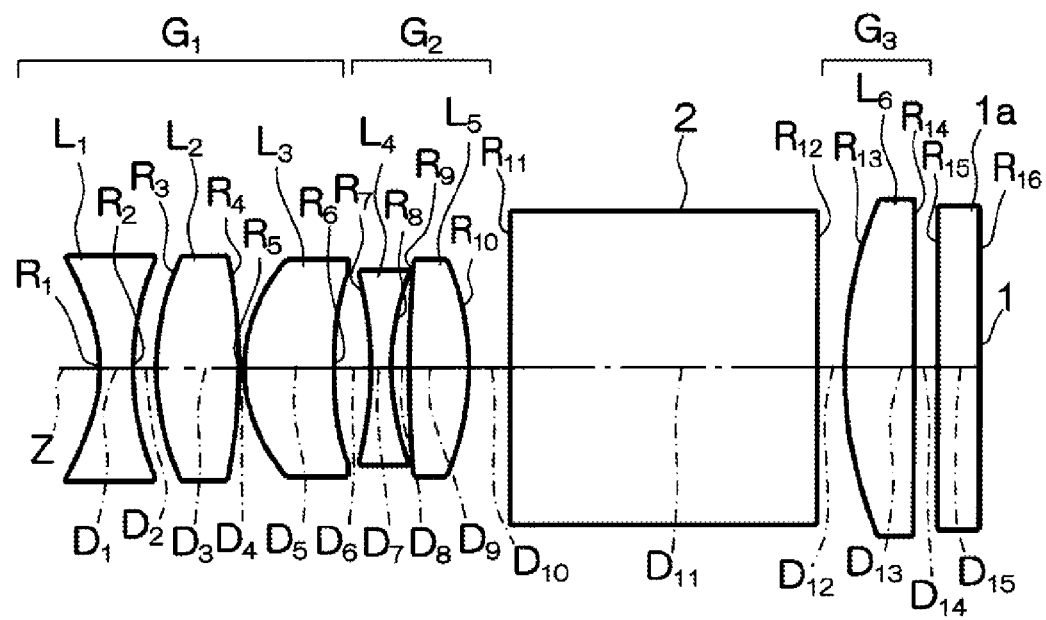
FIG. 4 is a diagram illustrating the structure of a projection lens in Example 4.

FIG. 4 is a schematic diagram illustrating the structure of a projection lens in Example 4. The projection lens in Example 4 is structured in a substantially similar manner to Example 1. However, Example 4 mainly differs from Example 1 in that both surfaces of the third lens $L_3$ in the first lens group $G_1$ are aspheric, and the third lens $L_3$ is made of plastic (positive meniscus lens shape having a convex surface facing the magnification side in the vicinity of the optical axis).

Further, a wide space is maintained between the second lens group $G_2$ and the third lens group $G_3$, and a color combination prism (or a ray separation prism) 2 is arranged in the space between the second lens group $G_2$ and the third lens group $G_3$. The space between the second lens group $G_2$ and the third lens group $G_3$ is set so as to satisfy the range defined by the formula (1). Specifically, the value of $d_{23}/f_3$ is 0.49 in Example 4.

Table 7 shows data about Example 4. Table 7 shows the curvature radius R of each lens surface, the center thickness D of each lens and air space D between lenses, and refractive index $N_d$ and Abbe number $v_d$ of each lens for d-line.

As described above, both surfaces of the first lens $L_1$ and both surfaces of the third lens $L_3$ are aspheric. Table 8 shows aspheric coefficients K, $A_3/A_4$, $A_5$, $A_6$, $A_7$, $A_8$, $A_9$, $A_{10}$, $A_{11}$, and $A_{12}$ in the equation representing aspheric surfaces for these aspheric surfaces.

TABLE 7 f: 1.00, HALF ANGLE OF VIEW ω: 22.9°, FNo.: 2.20

| SURFACE NUMBER | CURVATURE RADIUS R | DISTANCE D | REFRACTIVE INDEX $N_d$ | ABBE NUMBER $v_d$ |
|---|---|---|---|---|
| OBJ | ∞ | 71.968 | | |
| 1* | −0.395 | 0.086 | 1.510100 | 56.2 |
| 2* | 0.692 | 0.061 | | |
| 3 | 0.719 | 0.215 | 1.772500 | 49.6 |
| 4 | −1.586 | 0.014 | | |
| 5* | 0.393 | 0.235 | 1.693500 | 53.2 |
| 6* | 1.255 | 0.097 | | |
| 7 | −1.020 | 0.054 | 1.846700 | 23.8 |
| 8 | 0.704 | 0.046 | | |
| 9 | 3.212 | 0.158 | 1.713000 | 53.9 |
| 10 | −0.751 | 0.108 | | |
| 11 | ∞ | 0.806 | 1.516300 | 64.1 |
| 12 | ∞ | 0.072 | | |
| 13 | 1.176 | 0.180 | 1.806100 | 40.9 |
| 14 | ∞ | 0.062 | | |
| 15 | ∞ | 0.108 | 1.516300 | 64.1 |
| 16 | ∞ | 0.000 | | |

*ASPHERIC SURFACE

Further, FIG. 10-*i* through 10-*iv* are diagrams illustrating aberrations in Example 4. FIG. 10-*i* illustrates spherical aberration in Example 4, and FIG. 10-*ii* illustrates astigmatism in Example 4, and FIG. 10-*iii* illustrates distortion in Example 4, and FIG. 10-*iv* illustrates lateral chromatic aberration in Example 4 (72.0 times magnification). As FIG. 10-*i* through 10-*iv* clearly illustrate, each aberration is corrected in an excellent manner in the projection lens of Example 4.

Further, as Table 13 shows, the projection lens in Example 4 satisfies the formulas (1) through (7), formulas (1') through (7') and formulas (2"), (6") and (7").

Example 5

Figure 5:
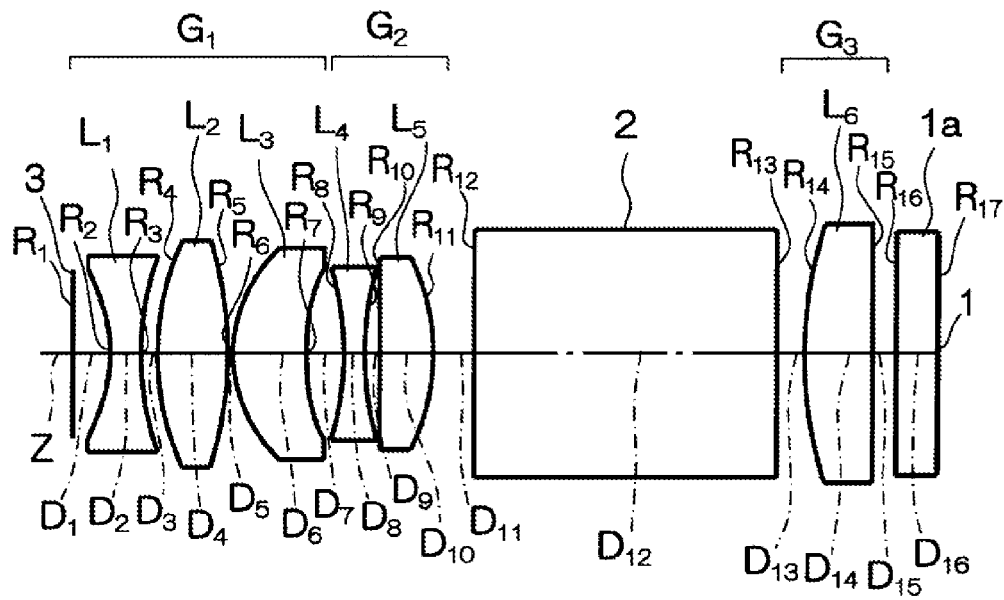
FIG. 5 is a diagram illustrating the structure of a projection lens in Example 5.

FIG. 5 is a schematic diagram illustrating the structure of a projection lens in Example 5. The projection lens in Example 5 is structured in a substantially similar manner to Example 2. However, Example 5 differs from Example 2 in that a stop 3 (a mask may be provided instead of the stop) is provided on the magnification side of the first lens $L_1$.

Further, a wide space is maintained between the second lens group $G_2$ and the third lens group $G_3$, and a color combination prism (or a ray separation prism) 2 is arranged in the space between the second lens group $G_2$ and the third lens group $G_3$. The space between the second lens group $G_2$ and the third lens group $G_3$ is set so as to satisfy the range defined by the formula (1). Specifically, the value of $d_{23}/f_3$ is 0.50 in Example 5.

Table 9 shows data about Example 5. Table 9 shows the curvature radius R of each lens surface, the center thickness D of each lens and air space D between lenses, and refractive index $N_d$ and Abbe number $v_d$ of each lens for d-line. As described above, both surfaces of the first lens $L_1$ and both surfaces of the third lens $L_3$ are aspheric. Table 10 shows aspheric coefficients K, $A_3$, $A_4$, $A_5$, $A_6$, $A_7$, $A_8$, $A_9$, $A_{10}$, $A_{11}$, and $A_{12}$ in the equation representing aspheric surfaces for these aspheric surfaces.

TABLE 9 f: 1.00, HALF ANGLE OF VIEW ω: 17.8°, FNo.: 2.20

| SURFACE NUMBER | CURVATURE RADIUS R | DISTANCE D | REFRACTIVE INDEX $N_d$ | ABBE NUMBER $v_d$ |
|---|---|---|---|---|
| OBJ | ∞ | 72.0303 | | |
| 1 (STOP) | ∞ | 0.100 | | |
| 2* | −0.368 | 0.079 | 1.510100 | 56.2 |

TABLE 8

ASPHERIC COEFFICIENT

| SURFACE NUMBER | K | $A_3$ | $A_4$ | $A_5$ | $A_6$ |
|---|---|---|---|---|---|
| 1 | 1.00000 | 0.00000E+00 | 4.06983E+00 | 1.62605E+01 | −7.52623E+01 |
| 2 | 1.00000 | 0.00000E+00 | −3.96289E+00 | 1.39482E+01 | 1.30803E+01 |
| 5 | 1.00000 | 0.00000E+00 | −2.41100E+00 | 0.00000E+00 | 2.57974E+00 |
| 6 | 1.00000 | 0.00000E+00 | 2.23771E+00 | 0.00000E+00 | 2.21007E+00 |

| | $A_7$ | $A_8$ | $A_9$ | $A_{10}$ | $A_{11}$ | $A_{12}$ |
|---|---|---|---|---|---|---|
| 1 | 1.58200E+02 | 9.38801E+01 | −1.57833E+03 | 3.12054E+03 | 0.00000E+00 | 0.00000E+00 |
| 2 | −6.85039E+01 | −8.43208E+01 | −2.99084E+01 | 8.15941E+02 | 0.00000E+00 | 0.00000E+00 |
| 5 | 0.00000E+00 | 5.16956E+01 | 0.00000E+00 | −6.40602E+02 | 0.00000E+00 | 0.00000E+00 |
| 6 | 0.00000E+00 | 1.24166E+02 | 0.00000E+00 | 5.80033E+02 | 0.00000E+00 | 0.00000E+00 |

TABLE 9-continued f: 1.00, HALF ANGLE OF VIEW ω: 17.8°, FNo.: 2.20

| SURFACE NUMBER | CURVATURE RADIUS R | DISTANCE D | REFRACTIVE INDEX $N_d$ | ABBE NUMBER $v_d$ |
|---|---|---|---|---|
| 3* | 0.729 | 0.045 | | |
| 4 | 0.746 | 0.186 | 1.772500 | 49.6 |
| 5 | −1.050 | 0.014 | | |
| 6* | 0.360 | 0.195 | 1.693500 | 53.2 |
| 7* | 0.775 | 0.101 | | |
| 8 | −0.775 | 0.054 | 1.846700 | 23.8 |
| 9 | 0.864 | 0.040 | | |
| 10 | −31.396 | 0.143 | 1.713000 | 53.9 |
| 11 | −0.595 | 0.108 | | |
| 12 | ∞ | 0.807 | 1.516300 | 64.1 |
| 13 | ∞ | 0.072 | | |
| 14 | 1.146 | 0.180 | 1.806100 | 40.9 |
| 15 | ∞ | 0.064 | | |
| 16 | ∞ | 0.108 | 1.516300 | 64.1 |
| 17 | ∞ | 0.000 | | |

*ASPHERIC SURFACE

TABLE 10

ASPHERIC COEFFICIENT

| SURFACE NUMBER | K | $A_3$ | $A_4$ | $A_5$ | $A_6$ |
|---|---|---|---|---|---|
| 2 | 1.00000 | 0.00000E+00 | 4.86139E+00 | 1.84013E+01 | −7.80155E+01 |
| 3 | 1.00000 | 0.00000E+00 | −4.54589E+00 | 1.63763E+01 | 2.08185E+01 |
| 6 | 1.00000 | 0.00000E+00 | −2.85002E+00 | 0.00000E+00 | 9.60284E+00 |
| 7 | 1.00000 | 0.00000E+00 | 2.74349E+00 | 0.00000E+00 | 1.98322E+01 |

| | $A_7$ | $A_8$ | $A_9$ | $A_{10}$ | $A_{11}$ | $A_{12}$ |
|---|---|---|---|---|---|---|
| 2 | 1.52393E+02 | 5.81402E+01 | −1.61795E+03 | 3.99994E+03 | 0.00000E+00 | 0.00000E+00 |
| 3 | −7.77149E+01 | −1.54453E+02 | −1.34723E+02 | 1.44825E+03 | 0.00000E+00 | 0.00000E+00 |
| 6 | 0.00000E+00 | 1.41061E+00 | 0.00000E+00 | −3.05437E+02 | 0.00000E+00 | 0.00000E+00 |
| 7 | 0.00000E+00 | −1.02770E+02 | 0.00000E+00 | 5.92258E+03 | 0.00000E+00 | 0.00000E+00 |

Further, FIG. 11-*i* through 11-*iv* are diagrams illustrating aberrations in Example 5. FIG. 11-*i* illustrates spherical aberration in Example 5, and FIG. 11-*ii* illustrates astigmatism in Example 5, and FIG. 11-*iii* illustrates distortion in Example 5, and FIG. 11-*iv* illustrates lateral chromatic aberration in Example 5 (72.0 times magnification). As FIG. 11-*i* through 11-*iv* clearly illustrate, each aberration is corrected in an excellent manner in the projection lens of Example 5.

Further, as Table 13 shows, the projection lens in Example 5 satisfies the formulas (1) through (7), formulas (1') through (7') and formulas (2"), (6") and (7").

Example 6

Figure 6:
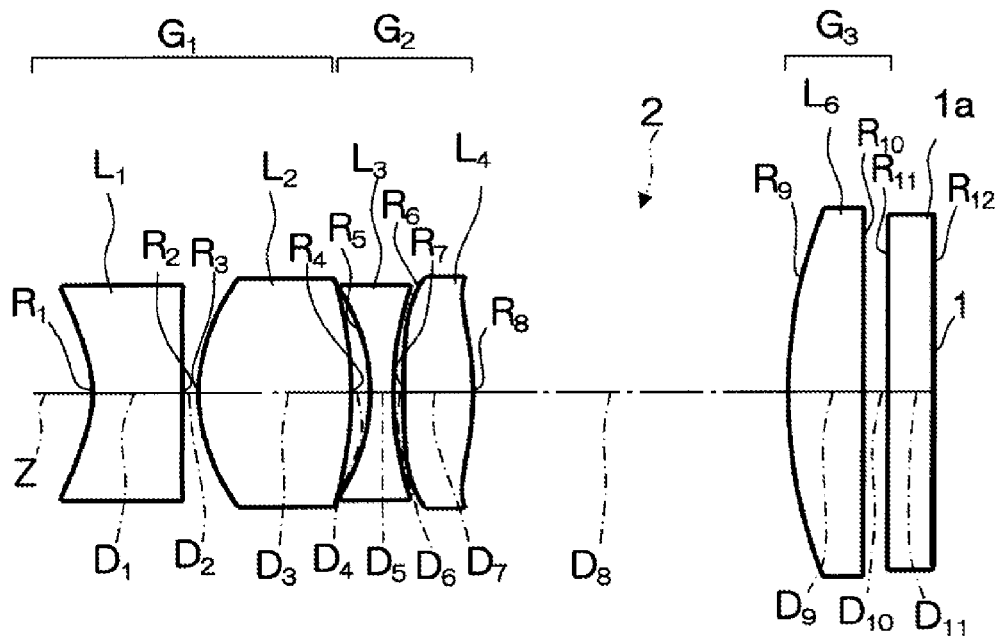
FIG. 6 is a diagram illustrating the structure of a projection lens in Example 6.

FIG. 6 is a schematic diagram illustrating the structure of a projection lens in Example 6. The projection lens in Example 6 is composed of five lenses in a manner similar to Example 3. However, Example 6 mainly differs from Example 3 in that both surfaces of the fourth lens $L_4$ in the second lens group $G_2$ are aspheric, and the fourth lens $L_4$ is made of plastic (double convex lens shape in the vicinity of the optical axis), and that an optical prism is not arranged between the second lens group $G_2$ and the third lens group $G_3$. In Example 5, an optical prism for separating/combining rays may be inserted between the second lens group $G_2$ and the third lens group $G_3$. Alternatively, a reflection mirror (2*d*) for separating rays may be arranged, as illustrated in FIG. 16.

Further, the space between the second lens group $G_2$ and the third lens group $G_3$ is set so as to satisfy the range defined by the formula (1). Specifically, the value of $d_{23}/f_3$ is 0.52 in Example 6.

Table 11 shows data about Example 6. Table 11 shows the curvature radius R of each lens surface, the center thickness D of each lens and air space D between lenses, and refractive index $N_d$ and Abbe number $v_d$ of each lens for d-line.

As described above, both surfaces of the first lens $L_1$ and both surfaces of the second lens $L_2$ and both surfaces of the fourth lens $L_4$ are aspheric. Table 12 shows aspheric coefficients K, $A_4$, $A_5$, $A_6$, $A_7$, $A_8$, $A_9$, $A_{10}$, $A_{11}$, and $A_{12}$ in the equation representing aspheric surfaces for these aspheric surfaces.

TABLE 11 f: 1.00, HALF ANGLE OF VIEW ω: 25.1°, FNo.: 2.20

| SURFACE NUMBER | CURVATURE RADIUS R | DISTANCE D | REFRACTIVE INDEX $N_d$ | ABBE NUMBER $v_d$ |
|---|---|---|---|---|
| OBJ | ∞ | 79.822 | | |
| 1* | −0.331 | 0.239 | 1.510100 | 56.2 |
| 2* | −6.056 | 0.042 | | |
| 3* | 0.419 | 0.406 | 1.834800 | 42.7 |
| 4* | −1.048 | 0.051 | | |
| 5 | −0.512 | 0.060 | 1.805200 | 25.4 |
| 6 | 0.872 | 0.030 | | |
| 7* | 3.496 | 0.184 | 1.772500 | 49.6 |
| 8* | −0.742 | 0.838 | | |
| 9 | 1.353 | 0.200 | 1.834800 | 42.7 |
| 10 | ∞ | 0.066 | | |
| 11 | ∞ | 0.120 | 1.516300 | 64.1 |
| 12 | ∞ | 0.000 | | |

*ASPHERIC SURFACE

TABLE 12

ASPHERIC COEFFICIENT

| SURFACE NUMBER | K | $A_3$ | $A_4$ | $A_5$ | $A_6$ |
|---|---|---|---|---|---|
| 1 | 1.00000 | 0.00000E+00 | 1.28674E+01 | 1.70656E+01 | −2.29450E+02 |
| 2 | 1.00000 | 0.00000E+00 | −2.26619E+00 | 1.90305E+01 | −3.50701E+01 |
| 3 | 1.00000 | 0.00000E+00 | −5.36574E+00 | 0.00000E+00 | 5.71369E+01 |
| 4 | 1.00000 | 0.00000E+00 | −3.20053E−01 | 0.00000E+00 | 9.59539E+00 |
| 7 | 1.00000 | 0.00000E+00 | 2.96324E+00 | 0.00000E+00 | 1.08356E+01 |
| 8 | 1.00000 | 0.00000E+00 | 2.02274E+00 | 0.00000E+00 | 2.64986E+00 |

| | $A_7$ | $A_8$ | $A_9$ | $A_{10}$ | $A_{11}$ | $A_{12}$ |
|---|---|---|---|---|---|---|
| 1 | 4.16384E+02 | 1.27361E+03 | −7.60099E+02 | −1.04046E+04 | −2.64514E+04 | 1.30506E+05 |
| 2 | 8.32473E+01 | 5.98553E+01 | −8.54003E+02 | −1.10198E+03 | 2.24827E+03 | 1.15377E+04 |
| 3 | −4.64922E+01 | −3.63889E+02 | 2.33018E+01 | 1.67068E+03 | 1.98668E+03 | −7.75967E+03 |
| 4 | 9.53505E+01 | −5.60177E+02 | −4.76271E+00 | 4.21821E+03 | −3.80502E+03 | −1.00132E+04 |
| 7 | 1.01738E+02 | −4.06136E+01 | −1.35470E+03 | −1.47497E+03 | 1.74072E+04 | −2.00369E+04 |
| 8 | 9.68716E+00 | 2.80400E+02 | 5.94351E+02 | −2.23248E+03 | −1.18042E+04 | 4.04111E+04 |

Further, FIG. 12-*i* through 12-*iv* are diagrams illustrating aberrations in Example 6. FIG. 12-*i* illustrates spherical aberration in Example 6, and FIG. 12-*ii* illustrates astigmatism in Example 6, and FIG. 12-*iii* illustrates distortion in Example 6, and FIG. 12-*iv* illustrates lateral chromatic aberration in Example 6 (72.0 times magnification).

As FIG. 12-*i* through 12-*iv* clearly illustrate, each aberration is corrected in an excellent manner in the projection lens of Example 6.

Further, as Table 13 shows, the projection lens in Example 5 satisfies the formulas (1) through (7), formulas (1') through (7') and formulas (6") and (7").

TABLE 13

| | (1), (1')<br>$d_{23}/f_3$ | (2), (2'), (2")<br>$\|D_{12}/\mathrm{ff}\|$ | (3), (3')<br>$\mathrm{bf}/f_3$ | (4), (4')<br>$f_3/f$ | (5), (5')<br>$D_{12}/f_3$ | (6), (6'), (6")<br>$f_1/f$ | (7), (7'), (7")<br>$f_2/f$ |
|---|---|---|---|---|---|---|---|
| EXAMPLE 1 | 0.43 | 32.90 | 0.08 | 1.65 | 0.70 | 0.62 | −1.85 |
| EXAMPLE 2 | 0.43 | 35.00 | 0.08 | 1.67 | 0.69 | 0.67 | −2.44 |
| EXAMPLE 3 | 0.46 | 20.80 | 0.08 | 1.53 | 0.76 | 0.45 | −0.85 |
| EXAMPLE 4 | 0.49 | 40.60 | 0.09 | 1.46 | 0.81 | 0.63 | −1.69 |
| EXAMPLE 5 | 0.50 | 236.80 | 0.10 | 1.42 | 0.83 | 0.64 | −1.73 |
| EXAMPLE 6 | 0.52 | 24.50 | 0.09 | 1.62 | 0.73 | 0.50 | −1.15 |

The projection optical system (projection lens) of the present invention and a projection-type display apparatus using the projection optical system of the present invention are not limited to the aforementioned examples. Various modifications are possible without departing from the gist of the present invention. For example, the shape of each lens, the number of lenses constituting each lens group, the position of arrangement of each lens may be set in an appropriate manner.

What is claimed is:

1. A projection lens comprising:
a first lens group having positive refractive power;
a second lens group having negative refractive power; and
a third lens group having positive refractive power, which are sequentially arranged from the magnification side of the projection lens,
wherein the reduction side of the projection lens is telecentric, and
wherein the following formulas (1) and (2) are satisfied:

$$0.30 \leq d_{23}/f_3 \leq 0.65 \qquad (1); \text{ and}$$

$$10 \leq |D_{12}/\mathrm{ff}| \qquad (2), \text{ where}$$

$d_{23}$: space in air between the second lens group and the third lens group,
$f_3$: focal length of the third lens group,
$D_{12}$: total length of the first lens group and the second lens group in the direction of an optical axis, and
ff: length from the most magnification-side surface in the entire system of the projection lens to a magnification-side focus point of the entire system of the projection lens.

2. A projection lens, as defined in claim 1, wherein the following formula (3) is satisfied:

$$\mathrm{bf}/f_3 \leq 0.2 \qquad (3), \text{ where}$$

bf: back focus in air of the entire system.

3. A projection lens, as defined in claim 1, wherein the following formula (4) is satisfied:

$$1.2 \leq f_3/f \leq 1.9 \qquad (4), \text{ where}$$

f: focal length of the entire system.

4. A projection lens, as defined in claim 1, wherein the following formula (5) is satisfied:

$$0.4 \leq D_{12}/f_3 \leq 1.1 \qquad (5).$$

5. A projection lens, as defined in claim 1, wherein the following formula (6) is satisfied:

$$0.2 \leq f_1/f \leq 1.0 \qquad (6), \text{ where}$$

$f_1$: focal length of the first lens group
f: focal length of the entire system.

6. A projection lens, as defined in claim 1, wherein the following formula (7) is satisfied:

$$-3.5 \leq f_2/f \leq -0.5 \qquad (7), \text{ where}$$

$f_2$: focal length of the second lens group
f: focal length of the entire system.

7. A projection lens, as defined in claim 1, wherein the first lens group is composed of a negative lens, a positive lens and a positive lens, which are sequentially arranged from the magnification side of the projection lens.

8. A projection lens, as defined in claim 1, wherein the first lens group is composed of a negative lens and a positive lens, which are sequentially arranged from the magnification side of the projection lens.

9. A projection lens, as defined in claim 7, wherein the second lens group is composed of a negative lens and a positive lens, which are sequentially arranged from the magnification side of the projection lens.

10. A projection lens, as defined in claim 8, wherein the second lens group is composed of a negative lens and a positive lens, which are sequentially arranged from the magnification side of the projection lens.

11. A projection lens, as defined in claim 9, wherein the third lens group consists of a positive lens.

12. A projection lens, as defined in claim 10, wherein the third lens group consists of a positive lens.

13. A projection lens, as defined in claim 1, wherein illumination light and projection light are separated from each other in an area between the second lens group and the third lens group.

14. A projection lens, as defined in claim 1, wherein rays from a plurality of light valves are combined together in an area between the second lens group and the third lens group.

15. A projection lens, as defined in claim 1, wherein a aperture stop is arranged on the magnification side of the first lens group.

16. A projection-type display apparatus comprising:
a light source;
a light valve;
an illumination optical unit that guides rays of light from the light source to the light valve; and
a projection lens, as defined in claim 1,
wherein the rays of light from the light source are optically modulated by the light valve and projected onto a screen by the projection lens.

* * * * *